(12) United States Patent
Bayley et al.

(10) Patent No.: US 6,944,143 B1
(45) Date of Patent: Sep. 13, 2005

(54) PRIORITIZATION OF SEARCHING BY A REMOTE UNIT IN A WIRELESS COMMUNICATION SYSTEM

(75) Inventors: Gwain Bayley, Carlsbad, CA (US); Robbin Hughes, San Diego, CA (US); Messay Amerga, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/540,802

(22) Filed: Mar. 31, 2000

(51) Int. Cl.$^7$ ................................................ H04Q 7/00
(52) U.S. Cl. ..................... 370/332; 370/331; 455/437; 455/226.2
(58) Field of Search ................................ 370/328, 329, 370/331, 332, 333; 455/434, 457, 515, 67.11, 226.2

(56) References Cited

U.S. PATENT DOCUMENTS

| | | | | |
|---|---|---|---|---|
| 5,999,816 A | * | 12/1999 | Tiedemann et al. | 455/437 |
| 6,069,880 A | * | 5/2000 | Owen et al. | 370/311 |
| 6,101,175 A | * | 8/2000 | Schorman et al. | 370/331 |
| 6,526,029 B1 | * | 2/2003 | Zhong | 370/335 |
| 6,542,743 B1 | * | 4/2003 | Soliman | 455/436 |

FOREIGN PATENT DOCUMENTS

| | | |
|---|---|---|
| EP | 0926915 | 6/1999 |
| GB | 2320655 | 5/1997 |
| GB | 2320655 A * | 6/1998 ............ H04Q/7/38 |
| WO | 9859448 | 12/1998 |
| WO | 0133871 | 5/2001 |

OTHER PUBLICATIONS

Copy of International Search Report dated Oct. 26, 2001.

* cited by examiner

Primary Examiner—Wellington Chin
Assistant Examiner—Mark A Mais
(74) Attorney, Agent, or Firm—Phil Wadsworth; Charles D. Brown; Howard H. Seo

(57) ABSTRACT

A method and apparatus for improving searching in a remote unit of a slotted mode, wireless, communication system. In a slotted mode communication system, the remote unit enters an "active state" during its assigned slot. While in the active state, a controller in the remote unit passes selected sets of search parameters to a search engine. The order that the searches are performed is based on the measured signal strength and the age of the measurement. The search engine performs searches using the selected sets of search parameters. Searching continues as long as the remote unit is in the active state. When the remote unit enters the inactive state, searching ceases. While in the inactive state, the controller evaluates the results of the searches performed during the previous active state. During the next active state, the next sequence of searching is performed based on measured signal strength and the measurement age corresponding to the measurements made during the previous active state.

17 Claims, 8 Drawing Sheets

FIGURE 7

PRIORITIZATION OF SEARCHING BY A REMOTE UNIT IN A WIRELESS COMMUNICATION SYSTEM

The following U.S. Patent Applications filed concurrently herewith, are related to this application and are hereby incorporated by reference in their entirety: REACQUISITION AND HANDOFF IN A SLOTTED MODE COMMUNICATION SYSTEM, U.S. patent application Ser. No. 09/540,801; FAST ACQUISITION OF A PILOT SIGNAL IN A WIRELESS COMMUNICATION DEVICE, U.S. patent application Ser. No 09/540,128; EFFICIENT SEARCHING BY A REMOTE UNIT IN A SLOTTED MODE COMMUNICATION SYSTEM, U.S. Pat. No. 6,704,577; DYNAMIC ADJUSTMENT OF SEARCH WINDOW SIZE IN RESPONSE TO SIGNAL STRENGTH, U.S. patent application Ser. No. 09/540,922; and DYNAMICALLY ADJUSTING INTEGRATION INTERVAL BASED ON A SIGNAL STRENGTH, U.S. Pat. No. 6,477,162.

FIELD OF THE INVENTION

The invention relates to wireless communication systems. In particular, the invention relates to prioritization of a search sequence in a remote unit in a wireless communication system.

BACKGROUND OF THE INVENTION

A wireless communication system may comprise multiple remote units and multiple base stations. FIG. 1 exemplifies an embodiment of a terrestrial wireless communication system with three remote units 10A, 10B and 10C and two base stations 12. In FIG. 1, the three remote units are shown as a mobile telephone unit installed in a car 10A, a portable computer remote 10B, and a fixed location unit 10C such as might be found in a wireless local loop or meter reading system. Remote units may be any type of communication unit such as, for example, hand-held personal communication system units, portable data units such as a personal data assistant, or fixed location data units such as meter reading equipment. FIG. 1 shows a forward link 14 from the base station 12 to the remote units 10 and a reverse link 16 from the remote units 10 to the base stations 12.

Communication between remote units and base stations, over the wireless channel, can be accomplished using one of a variety of multiple access techniques which facilitate a large number of users in a limited frequency spectrum. These multiple access techniques include time division multiple access (TDMA), frequency division multiple access (FDMA), and code division multiple access (CDMA). An industry standard for CDMA is set forth in the TIA/EIA Interim Standard entitled "Mobile Station-Base Station Compatibility Standard for Dual-Mode Wideband Spread Spectrum Cellular System", TIA/EIA/IS-95, and its progeny (collectively referred to here as IS-95), the contents of which are incorporated by reference herein in their entirety. Additional information concerning a CDMA communication system is disclosed in U.S. Pat. No. 4,901,307, entitled SPREAD SPECTRUM MULTIPLE ACCESS COMMUNICATION SYSTEM USING SATELLITE OR TERRESTRIAL REPEATERS, (the '307 patent) assigned to the assignee of the present invention and incorporated in its entirety herein by reference.

In the '307 patent, a multiple access technique is disclosed where a large number of mobile telephone system users, each having a transceiver, communicate through base stations using CDMA spread spectrum communication signals. The CDMA modulation techniques disclosed in the '307 patent offer many advantages over other modulation techniques used in wireless communication systems such as TDMA and FDMA. For example, CDMA permits the frequency spectrum to be reused multiple times, thereby permitting an increase in system user capacity. Additionally, use of CDMA techniques permits the special problems of the terrestrial channel to be overcome by mitigation of the adverse effects of multipath, e.g. fading, while also exploiting the advantages thereof.

In a wireless communication system, a signal may travel several distinct propagation paths as it propagates between base stations and remote units. The multipath signal generated by the characteristics of the wireless channel presents a challenge to the communication system. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the wireless channel, the multipath is created by reflection of the signal from obstacles in the environment such as, for example, buildings, trees, cars, and people. Accordingly, the wireless channel is generally a time varying multipath channel due to the relative motion of the structures that create the multipath. For example, if an ideal impulse is transmitted over the time varying multipath channel, the received stream of pulses changes in time delay, attenuation, and phase as a function of the time that the ideal impulse is transmitted.

The multipath characteristics of a channel can affect the signal received by the remote unit and result in, among other things, fading of the signal. Fading is the result of the phasing characteristics of the multipath channel. A fade occurs when multipath vectors add destructively, yielding a received signal that is smaller in amplitude than either individual vector. For example if a sine wave is transmitted through a multipath channel having two paths where the first path has an attenuation factor of X dB, a time delay of $\delta$ with a phase shift of $\Theta$ radians, and the second path has an attenuation factor of X dB, a time delay of $\delta$ with a phase shift of $\Theta+\pi$ radians, no signal is received at the output of the channel because the two signals, being equal amplitude and opposite phase, cancel each other. Thus, fading may have a severe negative effect on the performance of a wireless communication system.

A CDMA communication system is optimized for operation in a multipath environment. For example, the forward link and reverse link signals are modulated with a high frequency pseudonoise (PN) sequence. The PN modulation allows the many different multipath instances of the same signal to be separately received through the use of a "rake" receiver design. In a rake receiver, each element within a set of demodulation elements can be assigned to an individual multipath instance of a signal. The demodulated outputs of the demodulation elements are then combined to generate a combined signal. Thus, all of the multipath signal instances must fade together before the combined signal experiences a deep fade.

In a communication system based on the industry standard for CDMA, IS-95, each of the multiple base stations transmits a pilot signal having a common PN sequence. Each base station transmits the pilot signal offset in time from neighboring base stations so that the signals can be distinguished from one another at the remote unit. At any given time, the remote unit may receive a variety of pilot signals from multiple base stations. Using a copy of the PN sequence produced by a local PN generator, the entire PN space can be searched by the remote unit. Using the search results, the controller distinguishes pilot signals from multiple base stations based on the time offset.

In the remote unit, a controller is used to assign demodulation elements to the available multipath signal instances. A search engine is used to provide data to the controller concerning the multipath components of the received signal. The search engine measures the arrival time and amplitude of the multipath components of a pilot signal transmitted by the base stations. The effect of the multipath environment on the pilot signal and the data signal transmitted by a common base station is very similar because the signals travel through the same channel at the same time. Therefore, determining the multipath environment's effect on the pilot signal allows the controller to assign demodulation elements to the data channel multipath signal instances.

The search engine determines the multipath components of the pilot signals of base stations in the proximity of the remote unit by searching through a sequence of potential PN offsets and measuring the energy of the pilot signal received at each of the potential PN offsets. The controller evaluates the energy associated with a potential offset, and, if it exceeds a threshold, assigns a signal demodulation element to that offset. A method and apparatus of demodulation element assignment based on searcher energy levels is disclosed in U.S. Pat. No. 5,490,165 entitled DEMODULATION ELEMENT ASSIGNMENT IN A SYSTEM CAPABLE OF RECEIVING MULTIPLE SIGNALS, (the '165 patent) assigned to the assignee of the present invention.

FIG. 2 shows an exemplifying set of multipath signal instances of a single pilot signal from a base station arriving at a remote unit. The vertical axis represents the power received in decibels (dB). The horizontal axis represents the delay in the arrival time of a signal instance due to multipath delays. The axis (not shown) going into the page represents a segment of time. Each signal spike in the common plane of the page has arrived at the remote unit at a common time but has been transmitted by the base station at a different time. Each signal spike 22–27 has traveled a different path and therefore exhibits a different time delay, a different amplitude, and a different phase response. The six different signal spikes represented by spikes 22–27 are representative of a severe multipath environment. A typical urban environment produces fewer usable paths. The noise floor of the system is represented by the peaks and dips having lower energy levels. The task of the search engine is to identify the delay, as measured by the horizontal axis, and amplitude, as measured by the vertical axis, of signal spikes 22–27 for potential demodulation element assignment.

Note, as shown in FIG. 2, each of the multipath peaks varies in amplitude as a function of time as shown by the uneven ridge of each multipath peak. In the limited time shown, there are no major changes in the multipath peaks. Over a more extended time range, multipath peaks disappear and new paths are created as time progresses. Multipath peaks are likely to merge together or blur into a wide peak over time.

Typically, the operation of the search engine is overseen by a controller. The controller commands the search engine to step through a set of offsets, called a search window, that is likely to contain one or more multipath signal peaks suitable for assignment to a demodulation element. For each offset, the search engine reports the energy it found offset back to the controller. Demodulation elements may then be assigned by the controller to the paths identified by the search engine (i.e. the timing reference of their PN generators is aligned with the timing of the identified path). Once a demodulation element has locked onto the signal, it then tracks that path on its own without controller supervision, until the path fades away or until the demodulation element is assigned to another path by the controller.

As noted above, each base station in a given geographical area is assigned a sequence offset of a common PN pilot sequence. For example, according to IS-95, a PN sequence having $2^{15}$ chips and repeating every 26.66 milliseconds (ms) is transmitted by each base station in the system at one of 512 PN sequence offsets as a pilot signal. According to IS-95 operation, the base stations continually transmit the pilot signal which can be used by the remote unit to identify the base station as well as other functions, such as for example, determining the multipath environment the remote unit is operating in and synchronization of remote unit timing to the base station timing.

During initial power on, or any other situation when the remote unit has lost a pilot signal such as when performing a hard hand-off to a different operating frequency, the remote unit evaluates all possible PN offsets of the pilot PN sequence. Typically, a search engine measures the pilot signal strength at all possible PN offsets, proceeding at a measurement rate that produces an accurate measure of the pilot signal present at the corresponding offset. Proceeding in this manner, the search engine determines the PN offset of base stations which are geographically near the remote unit. Searching each PN offset in this manner can take anywhere from hundreds of milliseconds to a few seconds depending on the channel conditions during acquisition. This amount of time for the remote unit to reacquire a pilot signal is detrimental to the remote unit operation, and may be annoying to the user of the remote unit.

FIG. 3 shows an extended portion of PN space on the horizontal axis. The groups of peaks 30, 32 and 34 represent transmissions from three different base stations. As shown, the signal from each base station signal experiences a different multipath environment. Also, each base station has a different PN offset from the PN reference 36. Thus, the controller may select a set of PN offsets corresponding to search windows for any of the identified base stations. This allows the remote unit to simultaneously demodulate signals from multiple base stations by assigning demodulation elements appropriately.

In a typical CDMA communication system, remote units sporadically establish bi-directional communications with a base station. For example, a cellular telephone remains idle for significant periods of time when no call is in process. However, to ensure that any message directed to a remote unit is received, the remote unit continuously monitors the communication channel, even while it is idle. For example, while idle, the remote unit monitors the forward link channel from the base station to detect incoming calls. During such idle periods, the cellular telephone continues to consume power to sustain the elements necessary to monitor for signals from the base stations. Many remote units are portable and are powered by an internal battery. For example, personal communication system (PCS) handsets are almost exclusively battery-powered. The consumption of battery resources by the remote unit in idle mode decreases the battery resources available to the remote unit when a call is placed or received. Therefore, it is desirable to minimize power consumption in a remote unit in the idle state and thereby increase battery life.

One means of reducing remote unit power consumption in a communication system is disclosed in U.S. Pat. No. 5,392,287, entitled APPARATUS AND METHOD FOR REDUCING POWER CONSUMPTION IN A MOBILE COMMUNICATION RECEIVER (the '287 patent), assigned to the assignee of the present invention and hereby incorporated in its entirety herein by reference. In the '287 patent, a technique for reducing power consumption in a remote unit operating in an idle mode (i.e. a remote unit which is not engaged in bidirectional communication with a base station) is disclosed. In idle, each remote unit periodically enters an "active" state during which it prepares to and receives messages on a forward link communication channel. In the time period between successive active states, the remote unit enters an "inactive" state. During the remote unit's inactive state, the base station does not send any messages to that remote unit, although it may send messages to other remote units in the system that are in the active state.

As disclosed in the '287 patent, a base station broadcasts messages which are received by all remote units within the base station coverage area on a "paging channel." All idle remote units within the base station coverage area monitor the paging channel. The paging channel is divided in the time dimension into a continuous stream of "slots." Each remote unit operating in slotted mode monitors only specific slots which have been assigned to it as assigned slots. The paging channel continually transmits messages in numbered slots, repeating the slot sequence, such as for example, every 640 slots. When a remote unit enters the coverage area of a base station, or if a remote unit is initially powered on, it communicates its presence to a preferred base station. Typically the preferred base station is the base station which has the strongest pilot signal as measured by the remote unit.

The preferred base station, along with a plurality of geographically near neighboring base stations, assign a slot, or a plurality of slots, within their respective paging channels, for the remote unit to monitor. The base station uses the slots in the paging channel to transmit control information to a remote unit, if necessary. The remote unit may also monitor a timing signal from the preferred base station allowing the remote unit to align, in the time dimension, to the base station slot timing. By aligning in the time dimension to the preferred base station slot timing, the remote unit can determine when a paging channel slot sequence begins. Thus, knowing when the paging channel slot sequence begins, which slots are assigned for it to monitor, the total number of slots in the repetitive paging channel sequence of slots, and the period of each slot, the remote unit is able to determine when its assigned slots occur.

Generally, the remote unit is in the inactive state while the base station is transmitting on the paging channel in slots which are not within the remote unit's assigned set. While in the inactive state, the remote unit does not monitor timing signals transmitted by the base station, maintaining slot timing using an internal clock source. Additionally, while in the inactive state the remote unit may remove power from selected circuitry, such as, for example, circuits which monitor pilot signals transmitted by base stations to detect changes in the wireless channel including the search engine. Using its internal timing, the remote unit transits to its active state a short period of time before the next occurrence of an assigned slot.

When transiting to the active state, the remote unit applies power to circuitry that monitors the wireless channel, including the search engine. The search engine is used to reacquire the preferred base station's pilot signal and to detect changes in the wireless channel which may have occurred due to the movement of the remote unit or to the movement of objects within the coverage area of the base station. In addition to reacquiring the pilot signal, the remote unit may perform any other actions or initializations in preparation of receiving a message at the beginning of its assigned slot.

When the remote unit enters the active state, it may receive messages in its assigned slots in the paging channel and respond to commands from the base station. For example, the remote unit may be commanded to activate a "traffic" channel to establish a bidirectional communication link for conducting subsequent voice communication in response to an incoming call. If there is no message from the base station, or no command requesting the remote unit to remain active, at the end of the assigned slot the remote unit returns to the inactive state. In addition, the remote unit returns to the inactive state immediately if commanded to do so by the base station.

During its assigned slot, the remote unit's search engine measures the pilot signal strength of the preferred base station as well as the pilot signal strengths of neighboring base stations. If the remote unit relocates from the coverage area of one base station to another neighboring base station's coverage area, the remote unit needs to "hand-off" to the neighboring base station. A hand-off occurs when the transmitted pilot signal strength of a neighbor base station becomes sufficiently stronger than the preferred base station. When this occurs, the neighboring base station is assigned as the preferred base station. Following a hand-off, in the next active state, the remote unit monitors the paging channel of the new preferred base station to receive messages and commands.

In addition to providing data for determining when a hand-off should occur, searches of the preferred base station's pilot signal allow the remote unit to make adjustments to compensate for changes in the multipath environment. For example, if one of the multipath signal instances weakens to the point that it is unusable, the remote unit may reassign demodulation elements accordingly.

Knowing the nominal PN offset of the preferred base station as well as a neighboring set of base stations, typically, the controller passes a set of search parameters to the search engine specifying PN offsets at which multipath signal instances of pilot signals are likely to be found. At the completion of the search, the search engine passes the search results to the controller. The controller analyzes the search results and selects a set of search parameters for the next search. Following selection of the new search parameters, the controller passes the parameters to the search engine and the search process is repeated. This process is repeated until the remote unit once again enters the inactive idle state.

Typically, neighboring base stations are searched in a "round robin" sequence, with the remote unit searching PN offsets of neighboring base stations sequentially. Because searches occur only during the remote unit active state, a limited time period is available for the searches to be performed. Due to the limited time period available for conducting each search, all of the base stations are not evaluated. Thus, the performance of the remote unit is not able to be optimized. Accordingly, it would be a valuable improvement in the technology to provide a system and method by which the searching of base stations is prioritized.

SUMMARY OF THE INVENTION

The invention comprises a method and apparatus of searching in a remote unit which prioritizes the sequence of searches performed in a slotted mode communication system. In a slotted mode communication system, the remote unit may alternate between "active" and "inactive" states to prolong battery life. In such a system, the remote unit enters the active state just prior to its assigned slot, returning to the inactive state following its assigned slot or if commanded to enter the inactive state by a controller. Searches are performed by a search engine while the remote unit is in the active state.

In one embodiment of the invention, the remote unit builds a search list with entries comprising PN offset, pilot signal strength and measurement age. During the active state, the remote unit performs searches, using corresponding search parameters, in the following order: first the preferred base station is searched; then the remaining searches are performed by selecting to search, for example, first the base station having the oldest measurement, then the base station having the strongest measurement, then the base station having the next oldest measurement; then the base station having the next strongest measurement, and so on.

In another embodiment, the remote unit performs searches, using corresponding search parameters, in the following order: first the preferred base station is searched, then the second and third searches are performed on the oldest and next to oldest measurements, respectively, and then the remaining searches are performed in order according to signal strength, from strongest to weakness.

In one embodiment, search parameters for an individual search are passed to the search engine. Following completion of a search the search engine notifies the controller and another set of search parameters are passed to the search engine for the next search. In another embodiment, the controller passes a desired number of sets of search parameters to the search engine simultaneously. The search engine performs all the searches in the set before notifying the controller that searching is complete.

Prioritizing the search sequence allows a desired portion of resources of the search engine to search the PN offsets most likely to contain viable pilot signals, while ensuring some of the resources of the search engine are available for searching PN offsets less likely to contain viable pilot signals. Searching lower priority PN offsets with a lower probability of containing a viable pilot signal is necessary because, as the remote relocates, these lower priority signals may increase in strength and become more viable.

BRIEF DESCRIPTION OF THE DRAWINGS

The features, objects and advantages of the invention will become more apparent from the detailed description set forth below when taken in conjunction with the drawings in which like reference characters identify correspondingly throughout, and wherein:

FIG. 7 is a representative diagram illustrating another embodiment of a search list.

DETAILED DESCRIPTION OF THE INVENTION

Figure 1:
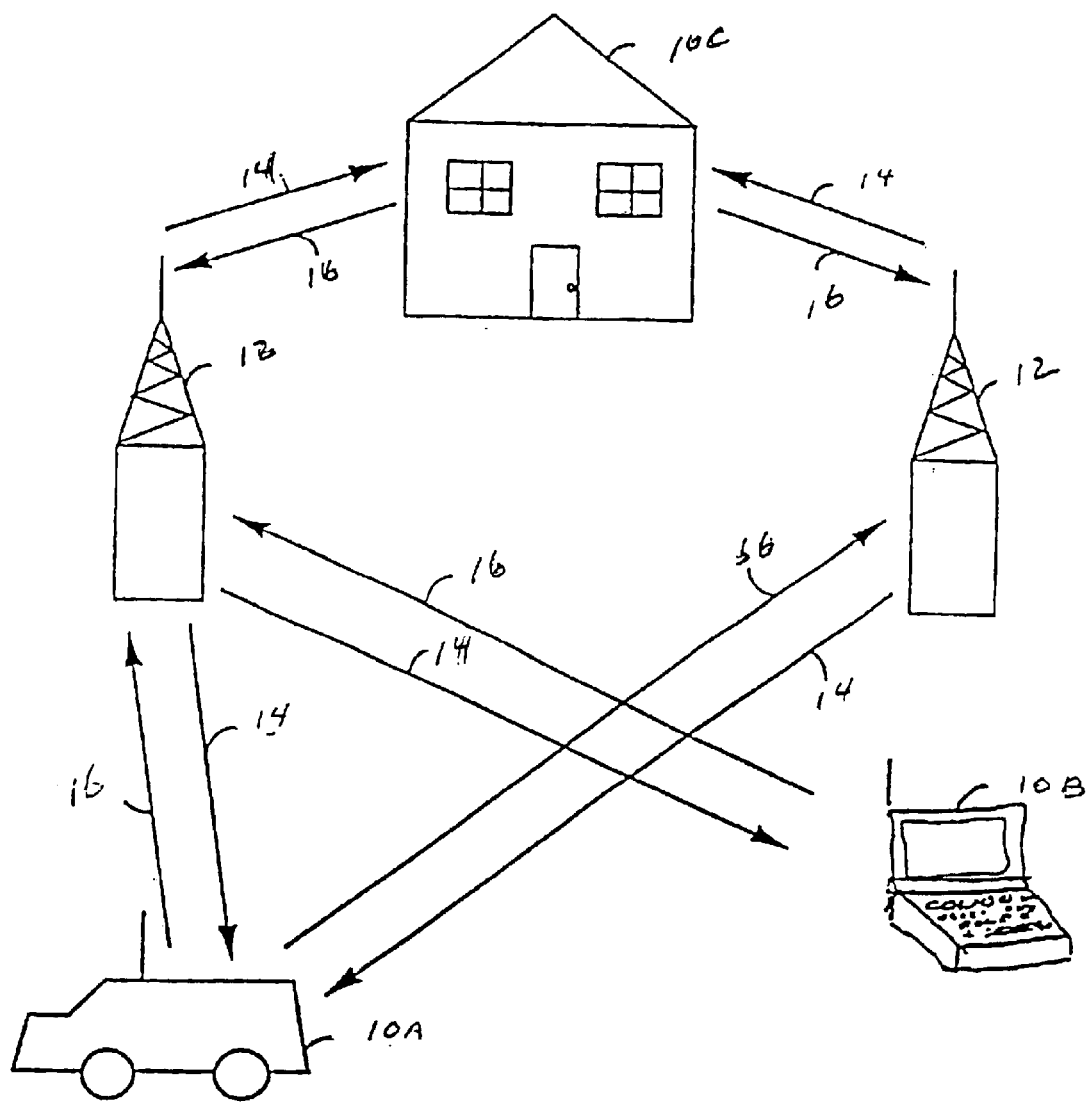
FIG. 1 is a representative diagram showing a typical modern wireless communication system.
Figure 2:
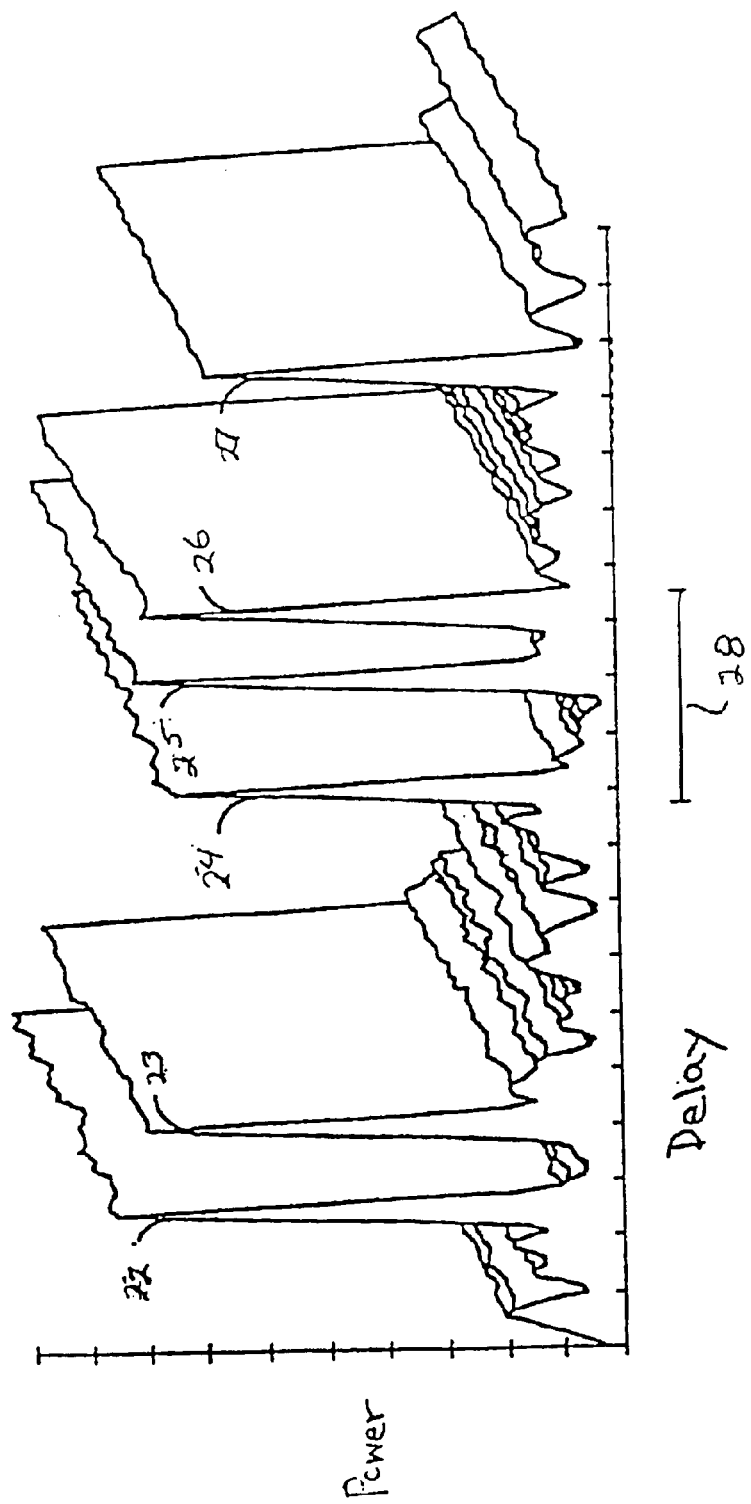
FIG. 2 is a graph showing an exemplifying set of multiple signal instances of a pilot signal from a single base station arriving at a remote unit.
Figure 3:
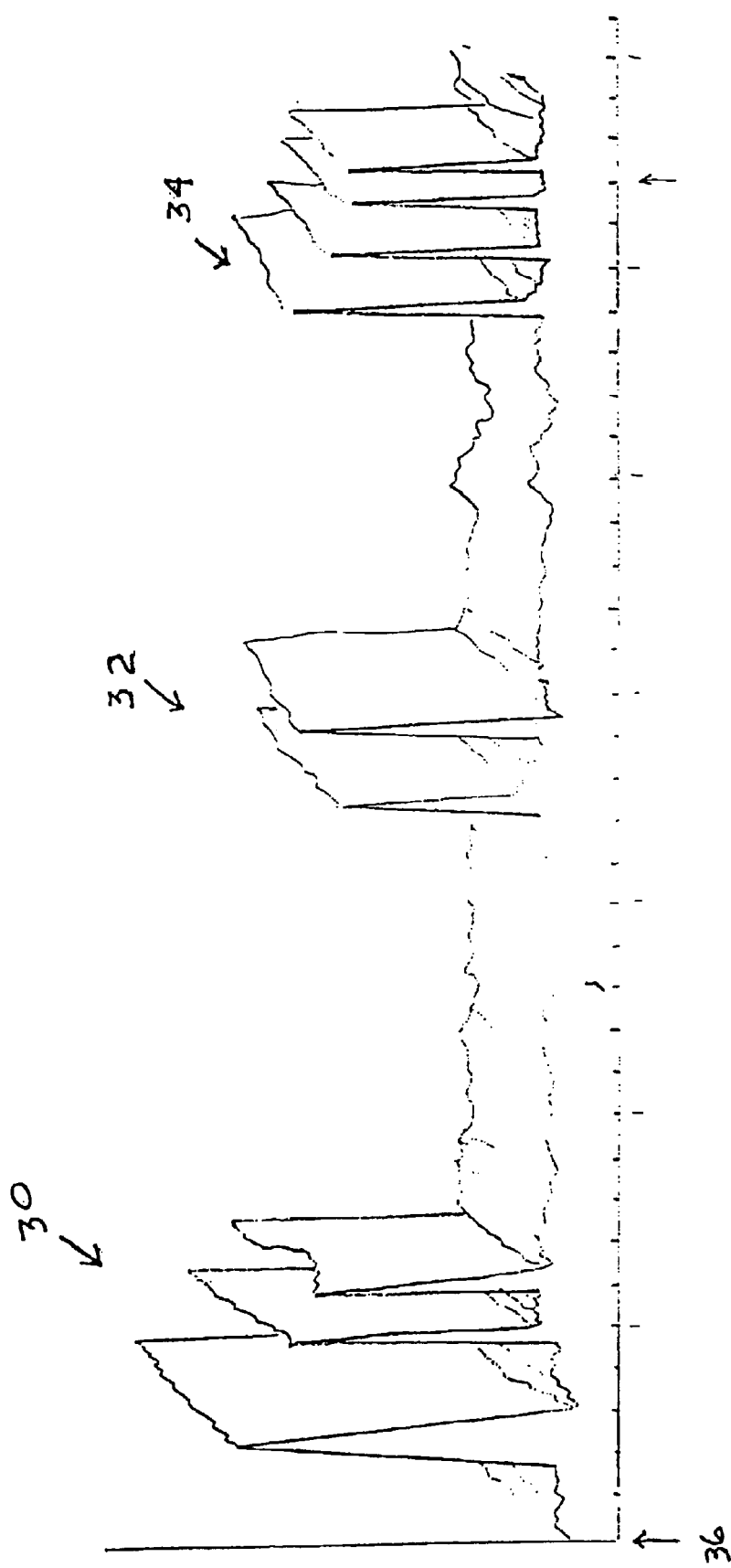
FIG. 3 is a graph showing an exemplifying set of multiple signal instances of pilot signals from multiple base stations arriving at a remote unit.
Figure 4:
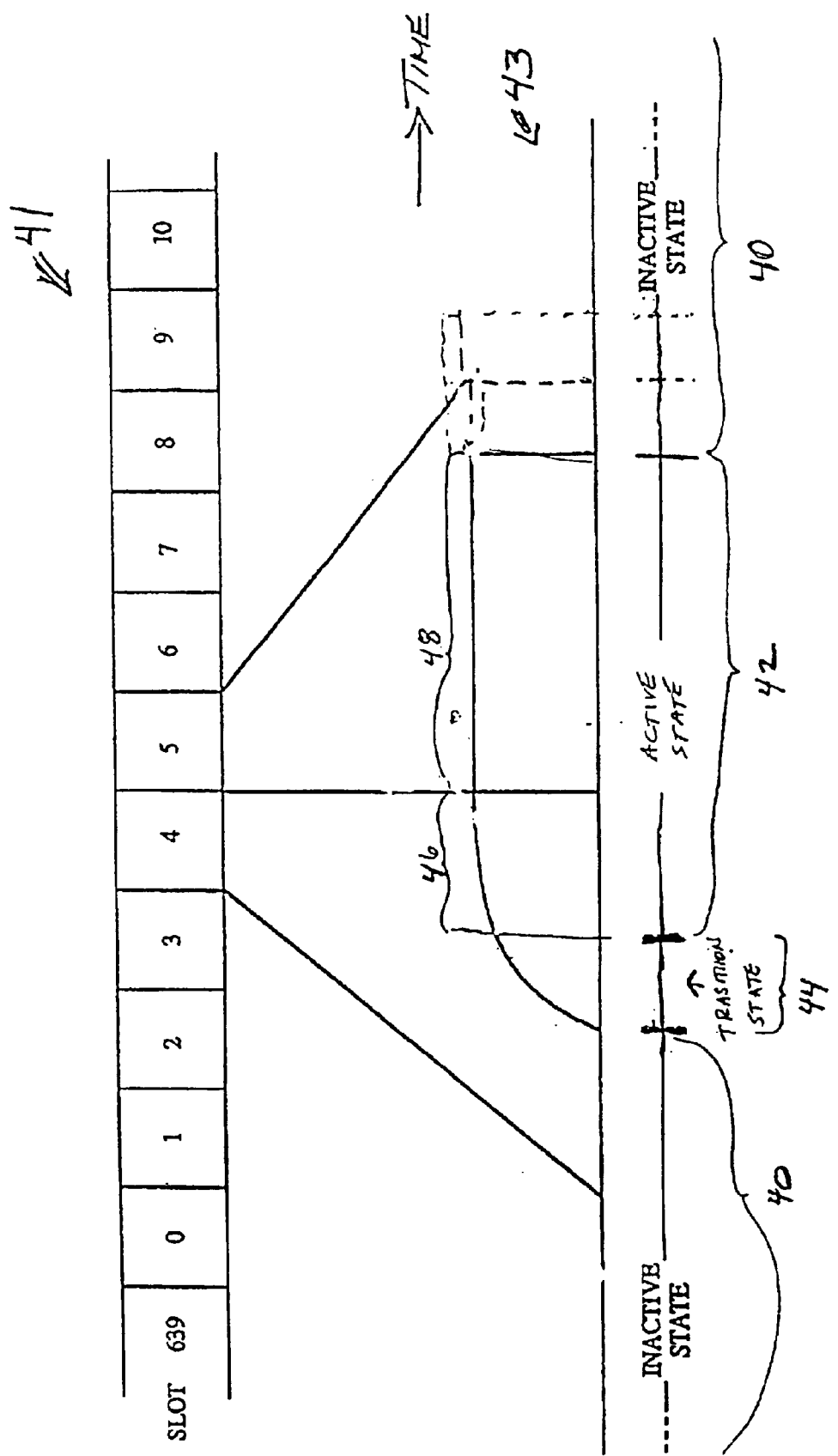
FIG. 4 is a representative diagram illustrating the transition from the inactive state to the active state at the assigned slot of a remote unit in a slotted mode communication system.

FIG. 4 shows a time line presented in two separate portions. An upper potion 41 represents a continual sequence of slots which flow in time from left to right. The lower portion 42 represents events occurring during a transition between active and inactive states of a remote unit in a slotted mode communication system in which slot 5 is an assigned slot. The time scale for the lower portion has been expanded so that the transition can be shown in more detail.

In particular, the lower portion 43 of FIG. 4 shows the transition from an inactive state 40 to an active state 42. In the active state 42, the remote unit monitors the base station signal during at least a portion of slot 5. Prior to the start of slot 5, the remote unit transits from the inactive state 40 to the active state 42 through a transition state 44. As described above, in the inactive state 40, selected circuitry in the remote unit is unpowered, reducing power consumption and extending battery life of the remote unit. For example, power may be removed from the search engine during the inactive state 40.

During the transition state 44, power is reapplied to the selected circuitry of the remote unit. For example, if the search engine is unpowered, power is reapplied in the transition state 44. The duration of the transition state 44 is sufficient to allow the remote unit to power on circuits and initialize functions so that the remote unit is functional, allowing it to perform searches at the end of the transition state 44.

Following the transition state 44, the remote unit enters the active state 42. The active state 42 is made up of two parts: a preparation period 46 and an assigned slot period 48. During the preparation period 46, an initial search is performed reacquiring the pilot signal of the preferred base station so that the remote unit is prepared to monitor the paging channel during the assigned slot period 48. The assigned slot period 48 begins at the beginning of slot 5.

Figure 5:
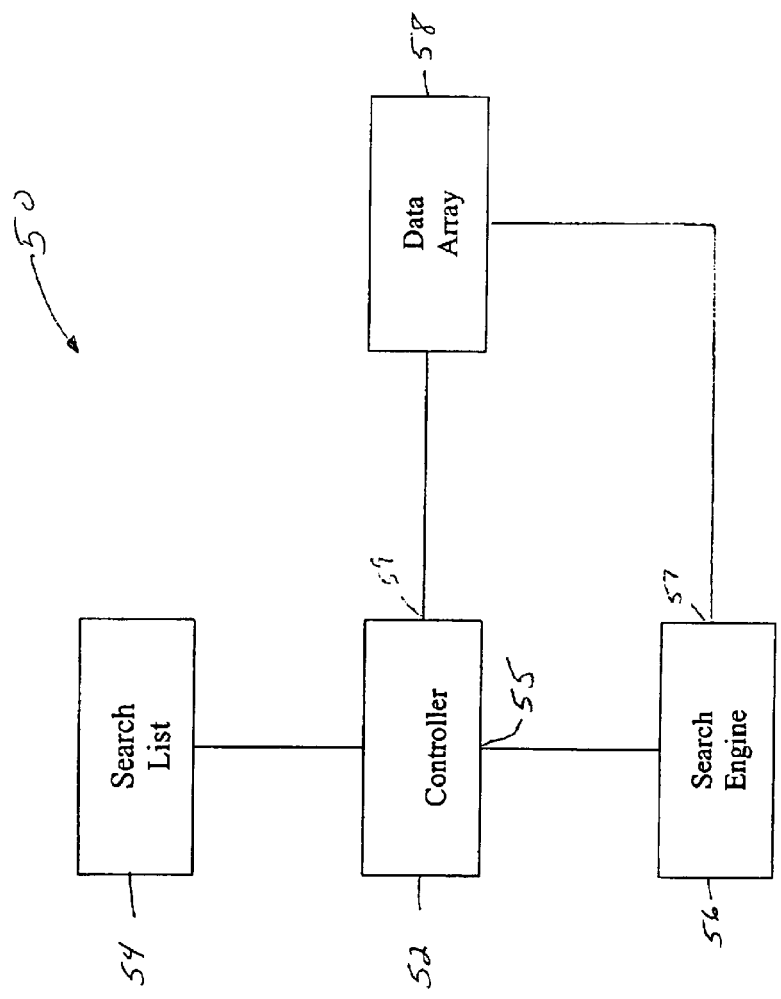
FIG. 5 is a block diagram of a remote unit according to an embodiment of the present invention.

During the assigned slot period 48, the remote unit receives messages on the paging channel from the preferred base station. Nominally, at the completion of slot 5, the assigned slot period 48 and the active state 42 terminate and the remote unit enters the inactive state 40. In order to further reduce the power consumption of the remote unit, the base station may command the remote unit to enter the inactive state 40 before the completion of slot 5. Alternatively, if the base station cannot complete the transfer of messages during slot 5, the base station may command the remote unit to remain in the assigned slot period 43 after the completion of the slot 5. Subsequently, the base station commands the remote unit to enter the inactive state 40. Searching terminates upon entering the inactive state 40 and power can be removed from the search engine. FIG. 5 is a block diagram of an embodiment of a remote unit which can be used to implement the invention. The remote unit 50 comprises a controller 52 in communication with a search list 54 stored in memory. The controller 52 also has a control port 55 in communication with a search engine 56 so as to pass search parameters to the search engine 56. The search engine 56 has an output port 57 in communication with a data array 58 so as to store search results. The controller 52 also has a data port 59 in communication with the data array 58 providing the controller 52 access to the search results stored therein. In one embodiment, the controller 52 is a microprocessor. In other embodiments, the controller 52 may be an Application Specific Integrated Circuit (ASIC), a Field Programmable Gate Array (FPGA), discrete logic, analog circuitry, or other control circuitry.

When a remote unit is initially powered on, no entries are in the search list 54. The remote unit may perform searches in accordance with the technique disclosed in the above-referenced U.S. patent application Ser. No. 09/540,128 entitled FAST ACQUISITION OF A PILOT SIGNAL IN A WIRELESS COMMUNICATION DEVICE or other well known techniques, to evaluate pilot signal strength. At the completion of searching, the search results are stored in the data array 58.

After the remote unit 50 has reacquired the preferred base station signal according to well-know techniques, the base station transmits nominal PN offsets for neighboring base stations to the remote unit 50 according to IS-95. The remote unit 50, using these offsets, searches the neighboring base stations and measures their pilot signal strengths. The controller 52 builds a search list 54 comprising the neighboring base station identification, measured pilot signal strength and measurement time. During subsequent searching by the remote unit 50, entries in the search list 54 are updated. Thus, the search list 54 contains the most current measured pilot signal strength of neighboring base stations and an indication of when the measurement was made.

Figure 6:
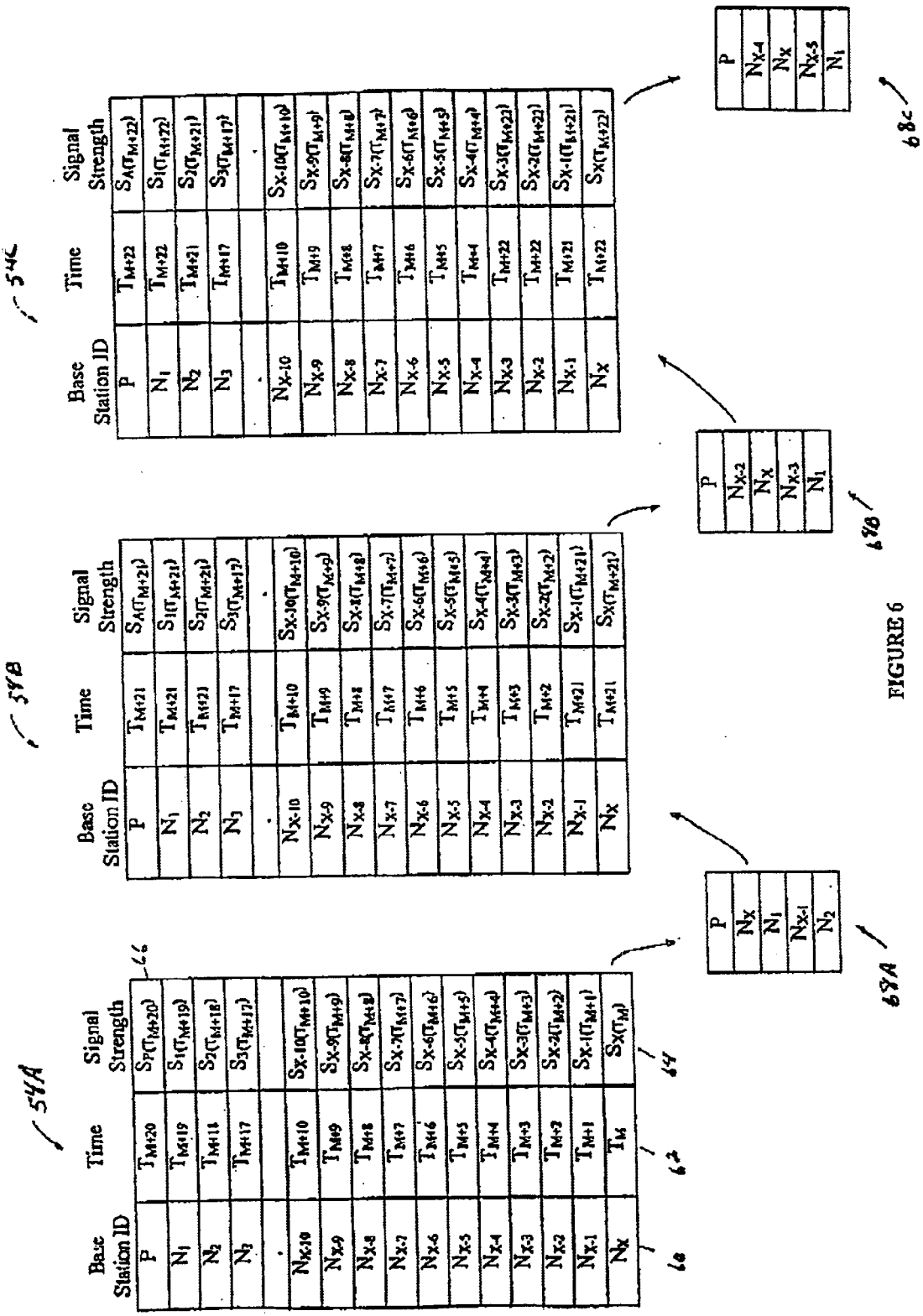
FIG. 6 is a representative diagram illustrating one embodiment of a search list.

FIG. 6 is a representative diagram illustrating one embodiment of the search list 54. The search list 54A comprises three elements per entry. The first element is a base station identification element 60. In FIG. 6, the preferred base station is identified as P, and the neighboring base stations are identified as $N_1$–$N_X$. A second element in the search list element 62 is the measurement time, i.e. when the base station pilot signal strength was measured. In FIG. 6, the measurement time is represented by T. The subscripts to T represent when the measurement was made, with a larger value subscript corresponding to a more recent time. For example, in the search list 54A, the oldest measurement time is $T_M$, corresponding to base station $N_X$. The remaining measurement times are more recent than $T_M$ as indicated by their larger subscript, up to the most recent measurement of $T_{M+20}$ corresponding to the preferred base station P. A third element of the search list is the measured pilot signal strength 64. The pilot signal strength for the base stations are identified as S. The subscript to S identifies the base station, and the corresponding measurement time of the measurement. For example, in the search list 54A the first entry 66 has a measured signal strength represented by $S_{P(TM+20)}$ corresponding to the preferred base station, P, measured at time $T_{M+20}$.

In the embodiment illustrated in FIG. 6, the controller 52 evaluates entries in the search list 54A to determine the order that searches of the preferred base station and neighboring base stations are performed. In this embodiment, the controller commands the search engine 56 to perform searches in the order shown in a table 68A. The first entry from the search list 54A that is searched is the preferred base station P. The remaining entries from the search list 54A are searched in order selecting the base station having the oldest measurement, the base station having the strongest measurement, the base station having the next oldest measurement, the base station having the next strongest measurement, and so on. In the example illustrated in FIG. 6, five entries from the search list 54A are searched in accordance with the order described above resulting in searches of base stations: P; $N_X$; $N_1$; $N_{X-1}$; and $N_2$.

Search parameters, such as, for example, search window size, PN offset, integration interval and number of noncoherent passes, corresponding to the entries in table 68A may be passed by the controller 52 to the search engine 56. Using the search parameters, the search engine 56 performs searches. Search parameters can vary for each base station being searched. For example, in one embodiment when the remote unit initially reenters the active state, it performs a search for the preferred base station. During the search the remote unit uses a search window size selected by the preferred base station and communicated to the remote unit during a previous active state. In addition, an integration interval of 512 chips is used. The search results for the preferred base station, such as, for example, pilot signal strength, can be used to select search window sizes, integration intervals and number of non-coherent passes used to search other base stations.

For example, a search window size selected by the preferred base station, and communicated to the remote unit, can be used to search the oldest two measurement base stations. A different search window size such as, for example, 512, 452, 384, 226, 160, 130, 100, or 60 chips can be used to search other base stations. Adjustment of the search window size in response to search results can be performed, for example, in accordance with the technique disclosed in the above-referenced U.S. patent application Ser. No. 09/540,922 entitled DYNAMIC ADJUSTMENT OF SEARCH WINDOW SIZE IN RESPONSE TO SIGNAL STRENGTH.

Additionally, the search results can be used to select the integration interval used to search other base stations. For example, an integration interval of 512 chips may be used when searching the two oldest measurement base stations. A different integration interval such as, for example, 360 or 256 chips may be used to search all remaining base stations. Adjustment of the integration interval in response to search results can also be performed, for example, in accordance with the technique disclosed in the above-referenced U.S. patent application Ser. No. 09/540,798 entitled DYNAMICALLY ADJUSTING INTEGRATION INTERVAL BASED ON A SIGNAL STRENGTH.

In addition, the search results can be used to select the number of non-coherent passes used to search other base stations. For example, the number of non-coherent passes may be varied between 1 and 7 passes, based in part on the measured signal strength of the preferred base station pilot signal strength.

The examples described above give specific values of search parameters that may be selected. However, it would be obvious to one of ordinary skill in the art that other combinations of search window size, integration interval and number of non-coherent passes may be selected to search base stations. Additionally, selection of search parameters can be based on search results other than the current preferred base station search results. For example, search parameters can be selected based on search results obtained during a previous active state of the remote unit.

In the embodiment illustrated in FIG. 6, during the active period the search engine may complete, for example, five searches corresponding to the base stations listed in table 68A. In other embodiments, more or fewer searches may be performed. For example, the preferred base station may command the remote unit to reenter its inactive state before the end of its assigned slot resulting in fewer searches being performed. Additionally, selection of search parameters may decrease the duration of searches of individual base stations resulting in more searches being performed during the remote unit active state. When the remote unit reenters the inactive state, the controller 52 updates the search list as shown in a search list 54B.

As illustrated in FIG. 6, the search list 54B is updated following the previous search performed on the base stations listed in table 68A. Because the preferred base station P was measured during the previous search, its measurement time has been set to $T_{M+21}$. The measurement of the preferred base station signal strength has also been updated to $S_{P(TM+21)}$, indicating the measurement is of the preferred base station, P, measured at time $T_{M+21}$. The other base stations measured during the previous search, $N_X$, $N_1$, $N_{X-1}$, and $N_2$, also have their measurements updated and the measurement time adjusted to reflect they were measured at time $T_{M+21}$.

When the remote unit enters the next active state, the controller 52 evaluates the entries in the search list 54B to determine the order that searches of the preferred base station and neighboring base station are performed. In this embodiment, the controller passes search parameters to the search engine 56 which performs searches in the order shown in a table 68B. The first entry from the search list 54B that is searched is the preferred base station P. The remaining entries from the search list 54B are searched in order selecting the base station having the oldest measurement, the base station having the strongest measurement, the base station having the next oldest measurement, the base station having the next strongest measurement, and so on. In the example illustrated in FIG. 6, during the previous searches base station $N_X$ had the strongest pilot signal strength of all measured base stations, however, not sufficiently strong to warrant a handoff. Therefore, the base stations searched during the next active state are searched in the order shown in table 54B: P; $N_{X-2}$; $N_X$; $N_{X-3}$; and $N_1$.

During the active state, search parameters corresponding to entries in the table 68B are passed by the controller 52 to the search engine 56 and the search engine 56 performs searches in the order shown in the table 68B. After the active period, the remote unit reenters the inactive state, and the controller 52 updates the search table as shown in a search list 54C.

As illustrated in FIG. 6, search list 54C is updated following the previous search performed on the base stations listed in table 68B. Because the preferred base station P was measured during the previous search, its measurement time has been increased to $T_{M+22}$. The measurement of the preferred base station signal strength has also been updated to $S_{P(TM+22)}$ indicating the measurement is of the preferred base station, P, measured at time $T_{M+22}$. The other base stations measured during the previous search, $N_{X-2}$, $N_X$, $N_{X-3}$, and $N_1$, also have their measurements updated and the measurement time adjusted to reflect that they were measured at time $T_{M+22}$.

The entries in table 54C for the other base stations remain unchanged. For example, the measured signal strengths for base stations $N_{X-1}$ and $N_2$ and their corresponding measurement times remain unchanged. Thus, the entries of search list 54C indicate base stations $N_{X-2}$; $N_X$; $N_{X-3}$; and $N_1$ have been measured more recently, at $T_{M+22}$, than base stations $N_{X-1}$ and $N_2$ which were measured at $T_{M+21}$.

When the remote unit enters the next active period, the controller 52 evaluates the entries in search list 54C to determine the order that searches of the preferred base station and neighboring base station are performed. In this embodiment, the controller 52 passes search parameters to the search engine 56 which performs searches in the order shown in a table 68C. The first entry from the search list 54C that is searched is the preferred base station P. The remaining entries from the search list 54C are searched in the order described above. In the example illustrated in FIG. 6, five entries from the search list 54C are searched: P; $N_{X-4}$; $N_X$; $N_{X-5}$; and $N_1$.

The embodiment illustrated in FIG. 6 has an advantage of guaranteeing a minimum update rate for all signal measurements. Alternating between base stations having the oldest measurements and base stations having the strongest measurements results in the stations with the oldest measurements being updated at a minimum rate while searching is concentrated on the base stations having the strongest measurements. In addition, by appropriately adjusting search window size and integration interval, it can be guaranteed that all base stations are searched with a desired search window size and an integration interval at a minimum rate. Appropriate adjustment of search window size and integration interval can ensure the remote unit complies with various specifications such as, for example, IS-95.

Figure 7:
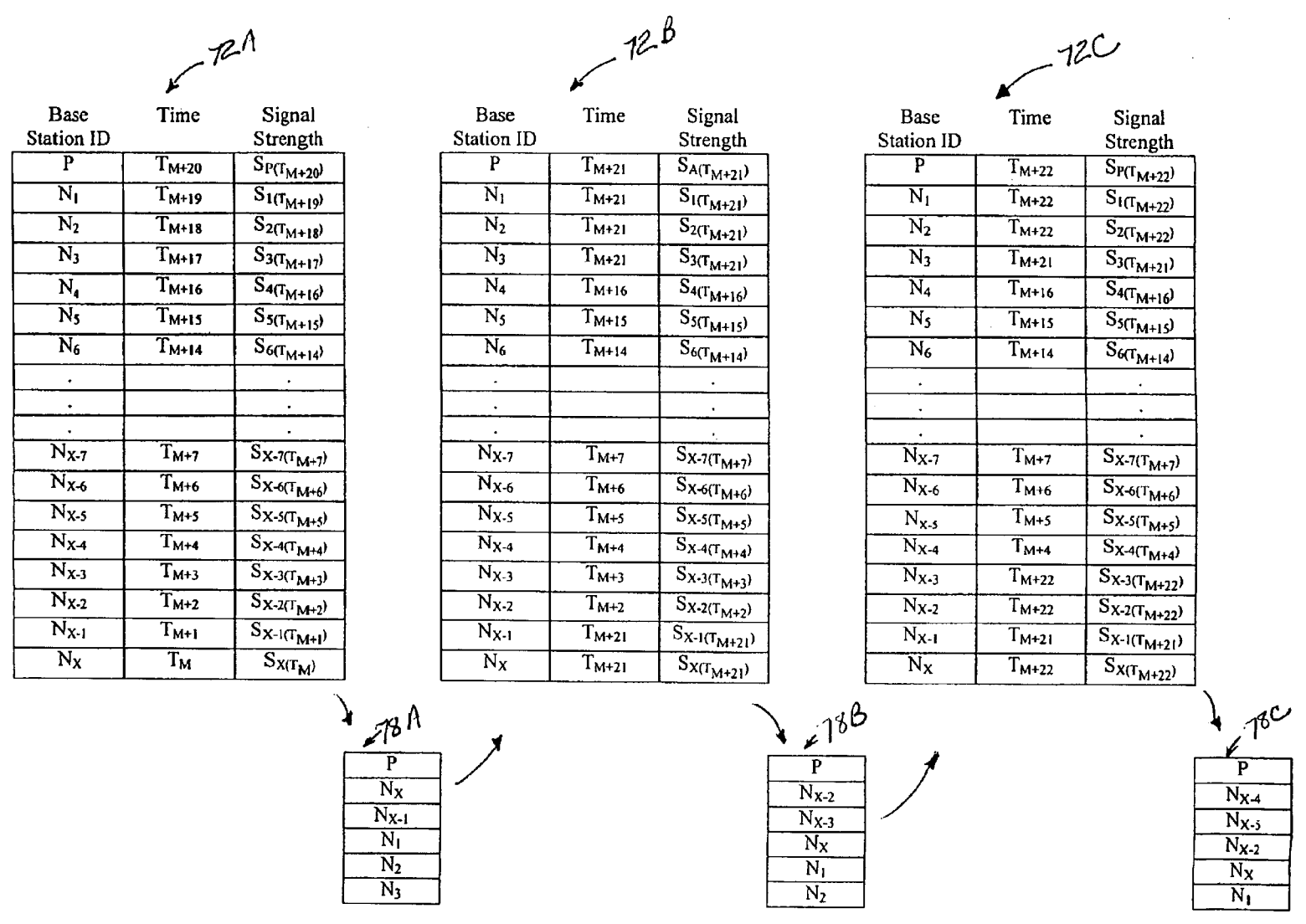

FIG. 7 is a representative diagram illustrating another embodiment of the search list. As illustrated in FIG. 7, a search list 72A is built by the controller 52 in a manner similar to that of search list 54A described above. In this embodiment, the remote unit evaluates entries in the search list and performs searches in the following order: first the preferred base station is searched, then the base stations having the two oldest measurements and then the remaining searches are performed on base stations in order of measured signal strength from strongest to weakest. In other embodiments, the number of base stations having the oldest measurements that are searched can vary. For example, just the base station having the oldest measurement may be searched, or the base stations having the three oldest measurements may be searched, or other combinations.

In the embodiment illustrated in FIG. 7, the controller 52 evaluates entries in the search list 72A to determine the order that searches of the preferred base station and neighboring base stations are performed. In this embodiment, the controller passes search parameters to the search engine 56 which performs searches in the order shown in table 78A. The first entry from the search list 72A that is searched is the preferred base station P. The next two base stations searched correspond to the two oldest measurements in the table, $N_X$ and $N_{X-1}$. The remaining entries in table 78A are ranked by pilot signal strength resulting in $N_1$, $N_2$, and $N_3$ being the next three entries.

Search parameters, such as, for example, search window size, PN offset, integration interval and number of noncoherent passes, corresponding to the entries in table 68A may be passed by the controller 52 to the search engine 56. Using the search parameters, the search engine 56 performs searches. Search parameters can vary for each base station being searched. For example, in one embodiment when the remote unit initially reenters the active state, it performs a search for the preferred base station. During the search the remote unit uses a search window size selected by the preferred base station and communicated to the remote unit during a previous active state. In addition, an integration interval of 512 chips is used. The search results for the preferred base station, such as, for example, pilot signal strength, can be used to select search window sizes, integration intervals and number of non-coherent passes used to search other base stations.

For example, a search window size selected by the preferred base station, and communicated to the remote unit, can be used to search the oldest two measurement base stations. A different search window size such as, for example, 512, 452, 384, 226, 160, 130, 100, or 60 chips can be used to search other base stations. Adjustment of the search window size in response to search results can be performed, for example, in accordance with the technique disclosed in the above-referenced U.S. patent application Ser. No. 09/540,922 entitled DYNAMIC ADJUSTMENT OF SEARCH WINDOW SIZE IN RESPONSE TO SIGNAL STRENGTH.

Additionally, the search results can be used to select the integration interval used to search other base stations. For example, an integration interval of 512 chips may be used when searching the two oldest measurement base stations. A different integration interval such as, for example, 360 or 256 chips may be used to search all remaining base stations. Adjustment of the integration interval in response to search results can also be performed, for example, in accordance with the technique disclosed in the above-referenced U.S. patent application Ser. No. 09/540,798 entitled DYNAMICALLY ADJUSTING INTEGRATION INTERVAL BASED ON A SIGNAL STRENGTH.

In addition, the search results can be used to select the number of non-coherent passes used to search other base stations. For example, the number of non-coherent passes may be varied between 1 and 7 passes, based in part on the measured signal strength of the preferred base station pilot signal strength.

The examples described above give specific values of search parameters that may be selected. However, it would be obvious to one of ordinary skill in the art that other combinations of search window size, integration interval and number of non-coherent passes may be selected to search base stations. Additionally, selection of search parameters can be based on search results other than the current preferred base station search results. For example, search parameters can be selected based on search results obtained during a previous active state of the remote unit.

In the embodiment illustrated in FIG. 7, during the active period the search engine may complete, for example, six searches corresponding to: the preferred base station P, the two base stations with the oldest measurements $N_X$ and $N_{X-1}$, and the remaining base stations in the order of their signal strength from strongest to weakest corresponding to $N_1$, $N_2$, and $N_3$. In other embodiments greater or fewer numbers of searches may be performed on these or other base stations. For example, the preferred base station may command the remote unit to reenter its inactive state before the end of its assigned slot resulting in fewer searches being performed. Additionally, as described above, selection of search parameters may decrease the duration of searches for an individual base station's signal, resulting in more searches performed during the remote unit active state. When the remote unit reenters the inactive state, the controller 52 updates the search list as shown in a search list 72B.

As illustrated in FIG. 7, the search list 72B is updated following the previous search performed on the base stations listed in the table 78A. Because the preferred base station P was measured during the previous search, its measurement time has been increased to $T_{M+21}$. The measurement of the preferred base station signal strength has also been updated to $S_{P(TM+21)}$ indicating the measurement is of the preferred base station, P, measured at time $T_{M+21}$. The other base stations measured during the previous search, $N_X$, $N_{X-1}$, $N_1$, $N_2$, and $N_3$, also have their measurements updated and the measurement time adjusted to reflect that they were measured at time $T_{M+21}$.

When the remote unit enters the next active period, the controller 52 evaluates the entries in search list 72B to determine the order that searches of the preferred base station and neighboring base station are performed. In this embodiment, the controller passes search parameters to the search engine 56 which performs searches in the order shown in table 78B. The first entry from the search list 72B that is searched is the preferred base station P. The next two entries correspond to the base stations with the oldest measurements, $N_{X-2}$ and $N_{X-3}$ The remaining entries from the search list 72B, are searched in order of their measured signal strength from strongest to weakest. In the example shown in FIG. 7, during the search of base stations listed in 78A, the measured pilot signal strength of base station $N_X$ was the strongest of all the neighboring base stations, however, not strong enough for a handoff to occur. Based upon these results, searches during the next active state are performed in the order shown in table 78B, beginning with the preferred base station, followed by the base stations having the two oldest measurements and the remaining base stations are searched in order of measured signal strength from strongest to weakest. Thus, the first six entries in table 78B are: P; $N_{X-2}$; $N_{X-3}$; $N_X$; $N_1$ and $N_2$.

During the active period, search parameters corresponding to entries in the table 78B are passed by the controller 52 to the search engine 56, which then performs searches. After the active period, when the remote unit reenters the inactive state, the controller 52 updates the search table as shown in a search list 72C.

As illustrated in FIG. 7, the search list 72C is updated following the previous search performed on the base stations listed in table 78B. Because the preferred base station P was measured during the previous search its measurement time has been increased to $T_{M+22}$. The measurement of the preferred base station signal strength has also been updated to $S_{P(TM+22)}$ indicating the measurement is of the preferred base station, P, measured at time $T_{M+22}$. The other base stations measured during the previous search, $N_{X-2}$, $N_{X-3}$, $N_X$, $N_1$ and $N_2$, also have their measurements updated and the measurement time adjusted to reflect they were measured at time $T_{M+22}$.

When the remote unit enters the next active period, the controller 52 evaluates the entries in the search list 72C to determine the order that searches of the preferred base station and neighboring base stations are performed. In the example shown in FIG. 7, during the search of base stations listed in table 78B, the measured pilot signal strength of base station $N_{X-2}$ was the strongest of all the neighboring base stations, however, not strong enough for a handoff to occur. The base station $N_x$ now has the second strongest pilot signal. Thus, the searches during the next active state are performed in the order shown in table 78C, beginning with the preferred base station, followed by the base stations having the two oldest measurements and the remaining base stations in order of measured signal strength from strongest to weakest. Thus, the first six entries in table 78C are: $N_{x-4}$; $N_{x-5}$; $N_{x-2}$; $N_x$ and $N_1$.

An advantage to this embodiment is that a minimum update rate is guaranteed for all base stations while still concentrating search efforts on the base stations having the strongest signal measurements, i.e. those most likely to result in the execution of a handoff to a new preferred base station. In addition, by appropriately adjusting search window size and integration interval, it can be guaranteed that all base stations are searched with a desired search window size and an integration interval at a minimum rate. Appropriate adjustment of search window size and integration interval can ensure the remote unit complies with various specifications such as, for example, IS-95.

In the embodiments described above, the search parameters corresponding to the entries in the search lists 54 and 72 to be searched are determined during the active state of the remote unit. In other embodiments, the search list may be determined during the inactive state. Corresponding search parameters may then be passed by the controller 52 to the search engine 56 without having to parse through the search list, 54 or 72, during the active state. In one embodiment, search parameters for each search are passed to the search engine 56 individually and the search engine 56 interrupts the controller 52 at the completion of each search. The controller 52 then passes the next set of search parameters to the search engine 56. In another embodiment, parameters for all searches to be performed during an active state are passed to the search engine 56 simultaneously. The search engine 56 then performs all searches without interrupting the controller 52.

Figure 8:
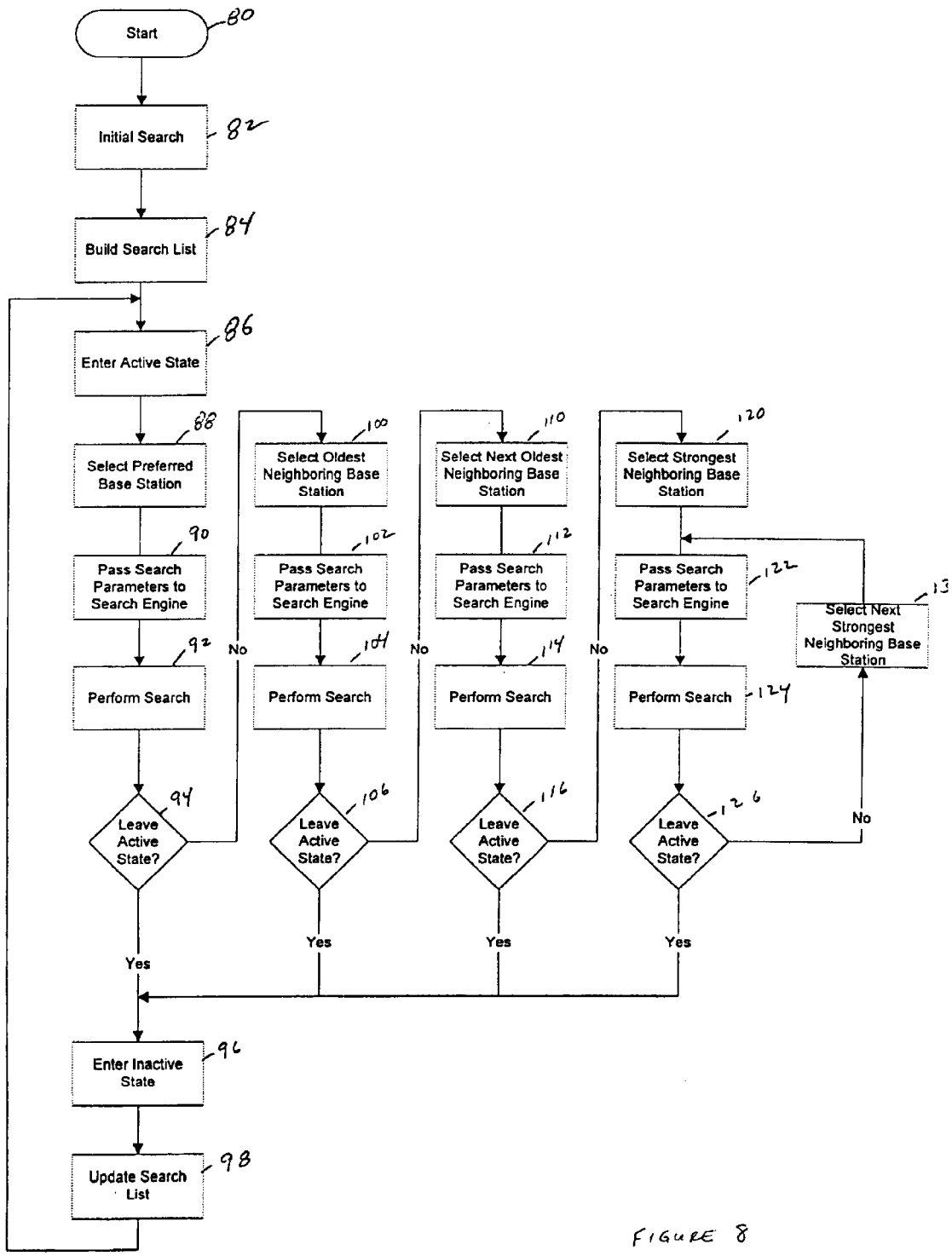
FIG. 8 is a flowchart illustrating the method of operation of one embodiment of the invention.

FIG. 8 is a flow chart illustrating the method of operation of one embodiment of the invention. In particular, it is noted that flow begins in block 80. In block 82, an initial search is performed by the remote unit. This search may be performed in accordance with the above referenced U.S. patent application Ser. No. 09/540,128 entitled FAST ACQUISITION OF A PILOT SIGNAL IN A WIRELESS COMMUNICATION DEVICE. Following the initial search, flow continues to block 84. In block 84, the controller builds a search list. Flow then continues to block 86 where the remote unit enters the active state, and flow continues to block 88.

In block 88, the controller selects the preferred base station from the search list. Flow then continues to block 90 wherein the controller passes search parameters for the preferred base station to the search engine. In block 92, the search engine performs a search. Flow then continues to block 94 wherein the controller determines if it is to leave the active state. As discussed above, the controller can be commanded by the preferred base station to leave the active state and reenter the inactive state. Additionally, the remote unit may reach the end of its assigned slot, at which time if not commanded by the preferred base station to remain in the active state, the remote unit enters its inactive state. If the remote unit determines it is to leave the active state, flow continues to block 96 where the remote unit enters the inactive state. Flow then continues to block 98 wherein the controller updates the search list. Flow then continues to block 86 where the remote unit waits to reenter the next active state.

Referring again to block 94, if the remote unit determines it is not to leave its active state, flow continues to block 100. In block 100, the controller evaluates the search list and selects the oldest measured base station. Flow then continues to block 102 wherein search parameters for the oldest measured base station are passed to the search engine. In block 104, the search engine performs a search. Flow then continues to block 106 wherein the controller evaluates if it is to leave the active state. If the controller is to leave the active state, flow continues to block 96 and the remote unit enters the inactive state. If in block 106 it is determined that the remote unit is to remain in the active state flow continues to block 110.

In block 110, the controller evaluates the search list and selects the second oldest measured base station. Flow then continues to block 112 wherein search parameters for the second oldest measured base station are passed to the search engine. In block 114, the search engine performs a search and flow continues to block 116. In block 116, the controller determines if is to leave the active state. If the remote unit is to leave the active state, flow continues to block 96 and the remote unit enters the inactive state. If in block 116, it is determined that the remote is to remain in the active state, flow continues to block 120.

In block 120, the controller evaluates the search list and selects the strongest measured neighboring base station. Flow then continues to block 122 wherein search parameters for the selected base station are passed to the search engine. Flow continues to block 124 where the search performs the search. Flow then continues to block 126 wherein the remote unit determines if it is to leave the active state. If the remote unit is to leave the active state, flow continues to block 96 and the remote unit enters the inactive state. If in block 126 the controller determines it is to remain in the active state, flow continues to block 130.

In block 130, the controller evaluates the search list and selects the next strongest measured neighboring base station in the search list. Flow then continues to block 122 wherein the controller passes search parameters for the selected base station to the search engine. In block 124, the search engine performs a search. Flow then continues to block 126 wherein the controller determines if it is to leave the active state. If the remote unit is to be leave the active state, flow continues to block 96 where the remote unit enters the inactive state. If in block 126, the controller determines it is to remain in the active state, flow continues to block 130 and the next strongest measured neighboring base station from the search list it is selected. The remote unit continues to select neighboring base stations from the search list in rank of their measured signal strength from strongest to weakest until the remote is to leave the active state.

In contrast to the typical round robin searching technique, the embodiments of the invention describe techniques for prioritizing searching of neighboring base stations by the remote unit. Prioritizing the search sequence allows searching of PN offsets most likely to contain viable pilot signals, while also ensuring less likely PN offsets are searched at a minimum rate.

More information concerning the searching process, demodulating element assignment and search engines can be found in:

(1) U.S. Pat. No. 5,644,591, entitled METHOD AND APPARATUS FOR PERFORMING SEARCH ACQUISITION IN A CDMA COMMUNICATIONS SYSTEM;

(2) U.S. Pat. No. 5,805,648, entitled METHOD AND APPARATUS FOR PERFORMING SEARCH ACQUISITION IN A CDMA COMMUNICATIONS SYSTEM;

(3) U.S. Pat. Nos. 5,867,527 and 5,710,768, entitled METHOD OF SEARCHING FOR A BURSTY SIGNAL;

(4) U.S. Pat. No. 5,764,687, entitled MOBILE DEMODULATOR ARCHITECTURE FOR A SPREAD SPECTRUM MULTIPLE ACCESS COMMUNICATION SYSTEM;

(5) U.S. Pat. No. 5,577,022, entitled PILOT SIGNAL SEARCHING TECHNIQUE FOR A CELLULAR COMMUNICATIONS SYSTEM;

(6) U.S. Pat. No. 5,654,979, entitled CELL SITE DEMODULATION ARCHITECTURE FOR A SPREAD SPECTRUM MULTIPLE ACCESS COMMUNICATION SYSTEMS;

(7) Application Ser. No. 08/987,172, entitled MULTI CHANNEL DEMODULATOR, filed on Dec. 9, 1997; and (8) Application Ser. No. 09/283,010, entitled PROGRAMMABLE MATCHED FILTER SEARCHER, filed on Mar. 31, 1999; each of which is assigned to the assignee hereof and incorporated herein by reference, in its entirety.

The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of prioritizing searching by a remote unit for use in a wireless communication system comprising:
    selecting a plurality of base stations to be searched based on selected measurement criteria;
    selecting search parameters for a preferred base station;
    performing a search of said preferred base station;
    selecting search parameters for said plurality of base stations in response to search results of said preferred base station;
    performing at least one search of said plurality of base stations using said search parameters; and
    recording a result of said at least one search.

2. The method of claim 1 wherein said search parameters for said preferred base station were previously communicated to said remote unit from said preferred base station.

3. The method of claim 1 wherein said result is a measured signal strength of a pilot signal.

4. The method of claim 1 wherein said result is recorded in a search list.

5. The method of claim 1 wherein said at least one search of said plurality of base stations is performed in the following order:
    a preferred base station;
    a least recently measured neighboring base station;
    a second least recently measured neighboring base station; and
    remaining neighboring base stations in order of their measured signal strength from strongest to weakest.

6. The method of claim 1 wherein said at least one search of said plurality of base stations is preformed in the following order:
    a preferred base station;
    a neighboring base station having the oldest measurement age;
    a neighboring base station having strongest measured signal strength;
    a neighboring base station having next oldest measurement age; and
    a neighboring base station having next strongest measured signal strength.

7. The method of claim 1 wherein said at least one search of said plurality of base stations is performed during an assigned slot of the remote unit.

8. The method of claim 1 wherein the said at least one search of said plurality of base stations is performed during an entire active period of the remote unit.

9. The method of claim 1 wherein said plurality of base stations are neighboring base stations.

10. A remote unit in a wireless communication system comprising:
    a search engine configured to accept search parameters, perform searches and output search results;
    a data array coupled to said search engine and configured to store said search results;
    a search list configured to store search entries; and
    a controller configured to define said search parameters, to pass said search parameters to said search engine, to receive said search results, to pass said search list entries to the search list, and to receive search entries from the search list, wherein the controller is further configured to examine entries in said search list and determine a desired order for searches to be performed on the selected measurement criteria.

11. The remote unit of claim 10 wherein said selected measurement criteria is a measured strength of a signal transmitted by a base station and an age of said measured signal strength.

12. The remote unit of claim 10 wherein searches are performed in the following order:
    a preferred base station;
    a least recently measured neighboring base station;
    a next to the least recently measured neighboring base station; and
    remaining neighboring base stations in order of their measured signal strength from strongest to weakest.

13. The remote unit of claim 10 wherein searches are performed in the following order:
    a preferred base station;
    a neighboring base station having the oldest measurement age;
    a neighboring base station having strongest measured signal strength;
    a neighboring base station having next oldest measurement age; and
    a neighboring base station having next strongest measured signal strength.

14. A method of prioritizing searching by a remote unit in a wireless communication system comprising:
    selecting neighboring base stations to be searched based on selected measurement criteria;
    selecting search parameters for a preferred base station and said selected neighboring base stations;
    performing searches using said search parameters; and
    recording results of said searches.

15. A method of prioritizing searching by a remote unit for use in a wireless communication system comprising:
    means for selecting a plurality of base stations to be searched based on selected measurement criteria;

means for selecting search parameters for a preferred base station;

means for performing a search of said preferred base station;

means for selecting search parameters for said plurality of base stations in response to search results of said preferred base station;

means for performing at least one search of said plurality of base stations using said search parameters; and means for recording a result of said at least one search.

16. The remote unit of claim 15 wherein said means for selecting said search parameters for said preferred base station is receiving a set of search parameters previously communicated to said remote unit from said preferred base station.

17. The remote unit of claim 15 wherein said result is a measured signal strength of a pilot signal.

* * * * *